US012776267B2

(12) United States Patent
Xi et al.

(10) Patent No.: US 12,776,267 B2
(45) Date of Patent: Oct. 27, 2026

(54) PIXEL CIRCUITRY STRUCTURE TO IMPROVE ELECTRIC LEAKAGE PROBLEM

(71) Applicant: Wuhan Tianma Microelectronics Co., Ltd., Wuhan (CN)

(72) Inventors: Suping Xi, Wuhan (CN); Maoqing Zhou, Wuhan (CN)

(73) Assignee: WUHAN TIANMA MICROELECTRONICS CO., LTD., Wuhan (CN)

( * ) Notice: Subject to any disclaimer, the term of this patent is extended or adjusted under 35 U.S.C. 154(b) by 1 day.

(21) Appl. No.: 18/934,418

(22) Filed: Nov. 1, 2024

(65) Prior Publication Data

US 2025/0061857 A1 Feb. 20, 2025

(30) Foreign Application Priority Data

Jul. 19, 2024 (CN) ......................... 202410979829.4

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2320/045* (2013.01)

(58) Field of Classification Search
CPC ......... G09G 3/3233; G09G 2300/0819; G09G 2300/0852; G09G 2320/045; G09G 3/20; G09G 3/3208; G09G 3/3258
See application file for complete search history.

(56) References Cited

U.S. PATENT DOCUMENTS

| | | | | |
|---|---|---|---|---|
| 2018/0190197 | A1* | 7/2018 | Chang | H10K 59/1216 |
| 2021/0343238 | A1* | 11/2021 | Okabe | G09G 3/3275 |
| 2023/0245616 | A1* | 8/2023 | Kim | G09G 3/30 345/55 |
| 2023/0343294 | A1* | 10/2023 | Guo | G09G 3/3266 |
| 2023/0410744 | A1* | 12/2023 | Guo | G09G 3/3283 |
| 2023/0410745 | A1* | 12/2023 | Guo | G09G 3/3233 |
| 2024/0078976 | A1* | 3/2024 | Cheng | G09G 3/3233 |
| 2024/0087518 | A1* | 3/2024 | He | G09G 3/3266 |
| 2024/0412691 | A1* | 12/2024 | Yuan | G09G 3/3233 |

* cited by examiner

*Primary Examiner* — Benjamin C Lee
*Assistant Examiner* — Emily J Frank
(74) *Attorney, Agent, or Firm* — Christensen O'Connor Johnson Kindness PLLC

(57) ABSTRACT

A display panel and a method for driving the display panel, and a display apparatus. The display panel comprises a pixel circuit, the pixel circuit includes a driving module, a gate reset module electrically connected between a first signal line and a control node, a threshold compensation module electrically connected between an output end of the driving module and the control node, and a control module electrically connected between the control node and a control terminal of the driving module. A driving cycle of the pixel circuit comprises an initialization period, a charging period, and a light-emitting control period. The gate reset module is turned on during the initialization period, the threshold compensation module is turned on at least during the charging period, and the control module is turned on during the initialization period and the charging period and is turned off during the light-emitting control period.

14 Claims, 16 Drawing Sheets

PIXEL CIRCUITRY STRUCTURE TO IMPROVE ELECTRIC LEAKAGE PROBLEM

CROSS-REFERENCE TO RELATED APPLICATION

The present application claims priority to Chinese Application No. 202410979829.4 with the application title of "PIXEL CIRCUIT, METHOD FOR DRIVING THE SAME, DISPLAY PANEL AND DISPLAY APPARATUS", filed on Jul. 19, 2024, the content of which is incorporated herein by reference in its entirety.

TECHNICAL FIELD

The present disclosure relates to the field of display technologies, and particularly, to a display panel, a method for driving the display panel, and a display apparatus.

BACKGROUND

The display panel includes pixel circuits and light-emitting elements that are electrically connected. The pixel circuits are used to transmit driving currents to the light-emitting elements to drive the light-emitting elements to emit light.

However, the electric leakage problem of the driving transistor in the pixel circuit in the related art is relatively serious, and the operating stability of the driving transistor is not high, which may easily lead to deviations in the brightness of the light-emitting element, causing poor display issues such as flashing screen.

SUMMARY

In an aspect, embodiments of the present disclosure provide a display panel. The display panel includes a pixel circuit. The pixel circuit includes a driving module; a gate reset module electrically connected between a first signal line and a control node; a threshold compensation module electrically connected between an output terminal of the driving module and the control node; and a control module electrically connected between the control node and a control terminal of the driving module. A driving cycle of the pixel circuit comprises an initialization period, a charging period, and a light-emitting control period, the gate reset module is turned on during the initialization period, the threshold compensation module is turned on at least during the charging period, and the control module is turned on during the initialization period and the charging period and is turned off during the light-emitting control period.

In another aspect, embodiments of the present disclosure provide a method for driving a display panel. The display panel includes a pixel circuit. The pixel circuit comprises a driving module, a gate reset module, a threshold compensation module, and a control module. The gate reset module is electrically connected between a first signal line and a control node, the threshold compensation module is electrically connected between an output terminal of the driving module and the control node, and the control module is electrically connected between the control node and a control terminal of the driving module. The driving cycle of the pixel circuit comprises an initialization period, a charging period, and a light-emitting control period. The method comprises: controlling the gate reset module to be turned on during the initialization period; controlling the threshold compensation module to be turned on at least during the charging period; and controlling the control module to be turned on during the initialization period and the charging period and to be turned off during the light-emitting control period.

In a still another aspect, embodiments of the present disclosure provide a display apparatus. The display apparatus includes a display panel. The display panel includes a pixel circuit. The pixel circuit includes a driving module; a gate reset module electrically connected between a first signal line and a control node; a threshold compensation module electrically connected between an output terminal of the driving module and the control node; and a control module electrically connected between the control node and a control terminal of the driving module. A driving cycle of the pixel circuit comprises an initialization period, a charging period, and a light-emitting control period, the gate reset module is turned on during the initialization period, the threshold compensation module is turned on at least during the charging period, and the control module is turned on during the initialization period and the charging period and is turned off during the light-emitting control period.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings.

DESCRIPTION OF EMBODIMENTS

In order to better understand technical solutions of the present disclosure, the embodiments of the present disclosure are described in detail with reference to the drawings.

It should be clear that the described embodiments are merely part of the embodiments of the present disclosure rather than all of the embodiments. All other embodiments obtained by those skilled in the art shall fall into the protection scope of the present disclosure.

The terms used in the embodiments of the present disclosure are merely for the purpose of describing specific embodiment, rather than limiting the present disclosure. The terms "a", "an", "the" and "said" in a singular form in the embodiment of the present disclosure and the attached claims are also intended to include plural forms thereof, unless noted otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

Before elaborating on the technical solutions according to some embodiments of the present disclosure, the problems existing in the related art is first explained in the present disclosure.

Figure 1:
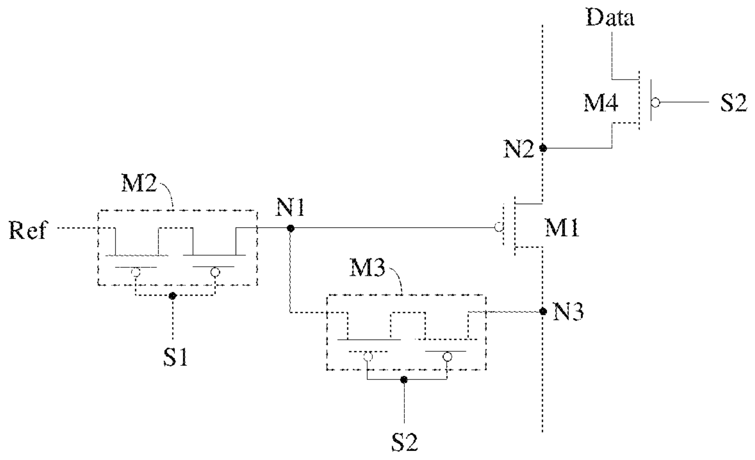
FIG. 1 (Prior art)
FIG. 1 is a schematic diagram of a partial structure of a pixel circuit of a display panel in the related art.

As shown in FIG. 1, which is a schematic diagram of a partial structure of a pixel circuit in the related art, the pixel circuit includes a driving transistor M1, a gate reset transistor M2, a threshold compensation transistor M3 and a data writing transistor M4.

The gate of the driving transistor M1 is electrically connected to a first node N1, the first electrode of the driving transistor M1 is electrically connected to a second node N2, and the second electrode of the driving transistor M1 is electrically connected to a third node N3.

The gate of the gate reset transistor M2 is electrically connected to a first scan line S1, the first electrode of the gate reset transistor M2 is electrically connected to a reset signal line Ref, and the second electrode of the gate reset transistor M2 is electrically connected to the first node N1.

The gate of the data writing transistor M4 is electrically connected to a second scan line S2, the first electrode of the data writing transistor M4 is electrically connected to a data line Data, and the second electrode of the data writing transistor M4 is electrically connected to the second node N2.

The gate of the threshold compensation transistor M3 is electrically connected to the second scan line S2, the first electrode of the threshold compensation transistor M3 is electrically connected to the third node N3, and the second electrode of the threshold compensation transistor M3 is electrically connected to the first node N1.

The driving cycle of the pixel circuit includes an initialization period, a charging period and a light-emitting control period.

During the initialization period, the gate reset transistor M2 is turned on to reset the first node N1. During the charging period, the data writing transistor M4 and the threshold compensation transistor M3 are turned on to charge the first node N1 and perform threshold compensation. During the light-emitting control period, the gate reset transistor M2, the data writing transistor M4 and the threshold compensation transistor M3 are all turned off.

However, during the light-emitting control period, due to the influence of off-state leakage current of the transistor, the first node N1 leaks current towards the gate reset transistor M2 and the threshold compensation transistor M3, so that the first node N1 is impossible to maintain a stable potential.

Furthermore, the off-state leakage current of a transistor is related to its corresponding |Vds|, and the larger the |Vds| of the transistor is, the greater its off-state leakage current will be. In the above structure, during the light-emitting control period, the Vds of the gate reset transistor M2 is $V_{N1}-V_{ref}$, and the Vds of the threshold compensation transistor M3 is $V_{N1}-V_{N3}$, both corresponding to relatively larger |Vds| values. This further exacerbates the leakage of the first node N1 towards the gate reset transistor M2 and the threshold compensation transistor M3, severely affecting the operating state of the driving transistor M1.

To address this issue, referring again to FIG. 1, in the related art, the transistors in the gate reset transistor M2 and the threshold compensation transistor M3 are set as dual-gate transistors with smaller off-state leakage currents. However, the improvement effect is not significant.

Figure 2:
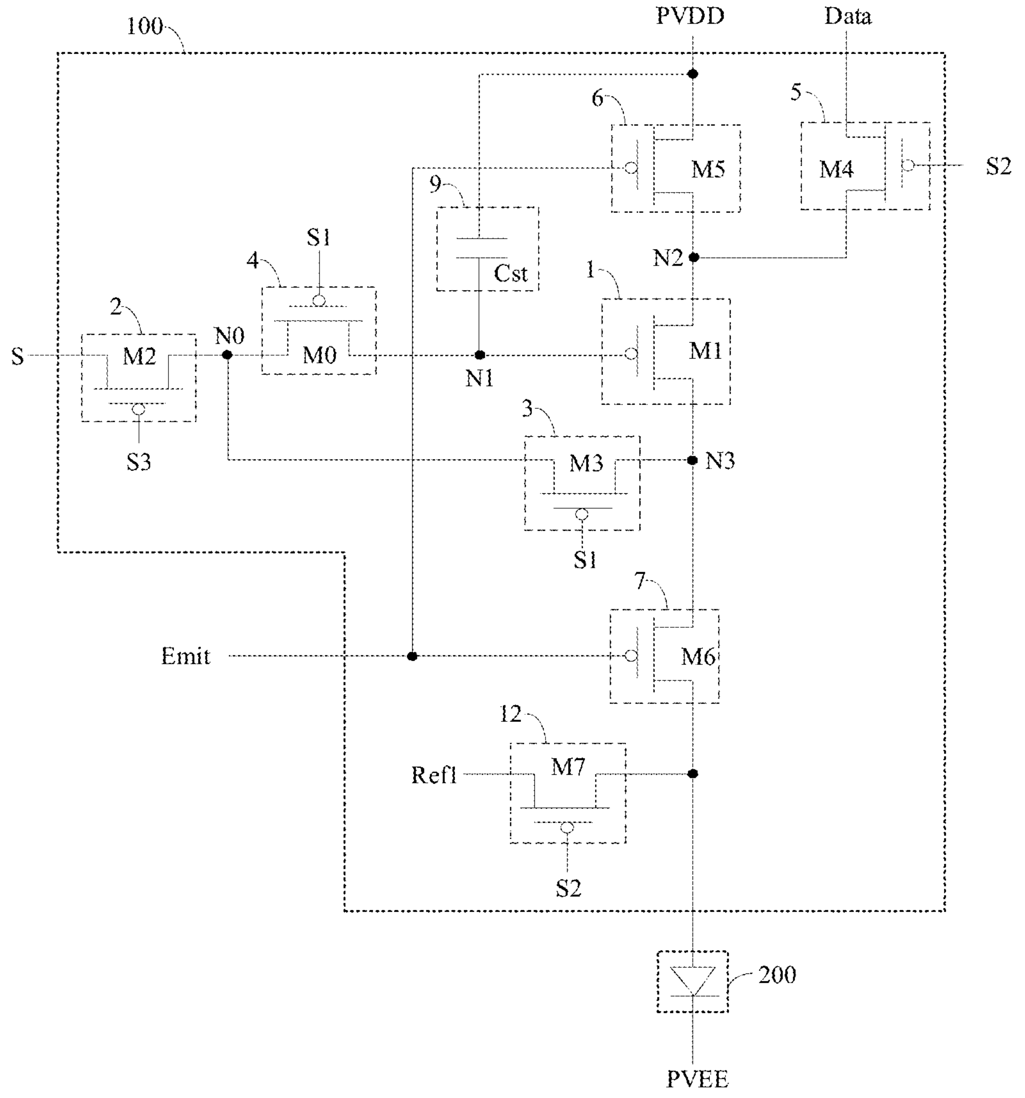
FIG. 2 is a structural schematic diagram of a pixel circuit according to some embodiments of the present disclosure.

In this regard, embodiments of the present disclosure provide a pixel circuit, as shown in FIG. 2, which is a structural schematic diagram of a pixel circuit 100 according to some embodiments of the present disclosure. The pixel circuit 100 includes a driving module 1, a gate reset module 2, a threshold compensation module 3, and a control module 4.

The gate reset module 2 is electrically connected between a first signal line S and a control node NO. The threshold compensation module 3 is electrically connected between an output terminal (third node N3) of the driving module 1 and the control node NO. The control module 4 is electrically connected between the control node NO and a control terminal (first node N1) of the driving module 1.

Figure 3:
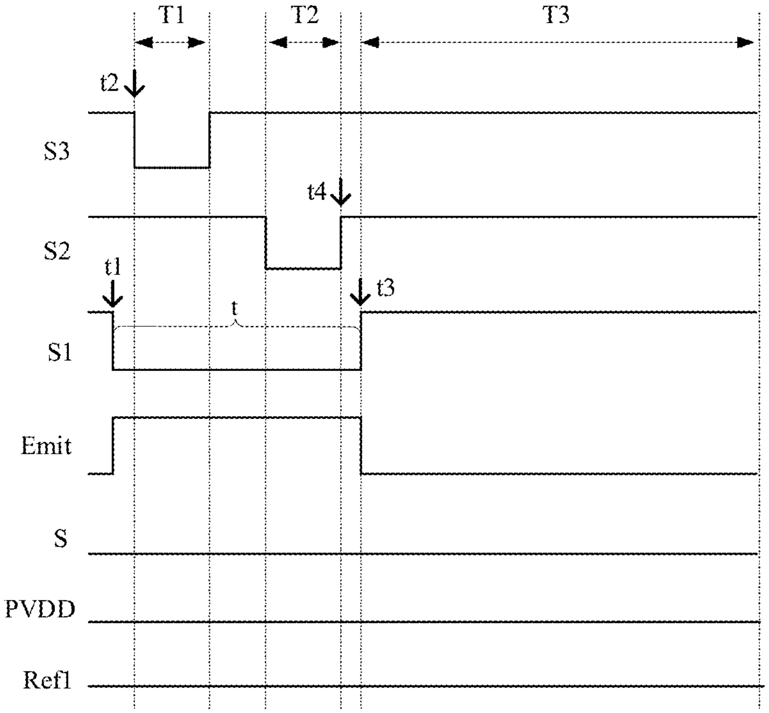
FIG. 3 is a timing diagram corresponding to FIG. 2 according to some embodiments of the present disclosure.

As shown in FIG. 3, which is a timing diagram corresponding to FIG. 2, the driving cycle of the pixel circuit 100 includes an initialization period T1, a charging period T2, and a light-emitting control period T3. The gate reset module 2 is turned on during the initialization period T1, the threshold compensation module 3 is turned on at least during the charging period T2, and the control module 4 is turned on during the initialization period T1 and the charging period T2 and is turned off during the light-emitting control period T3.

In addition, the pixel circuit 100 further includes a data writing module 5, which is electrically connected between a data line Data and an input terminal (second node N2) of the driving module 1. The data writing module 5 is turned on during the charging period T2.

Based on the above structure, during the initialization period T1, the gate reset module 2 and the control module 4 are turned on, and the voltage on the first signal line S is written into the control terminal of the driving module 1 to reset the control terminal of the driving module 1. During the charging period T2, the data writing module 5, the threshold compensation module 3 and the control module 4 are turned on, and the voltage on the data line Data is written into the control terminal of the driving module 1 to charge the control terminal of the driving module 1 and perform threshold compensation.

In the pixel circuit 100 according to some embodiments of the present disclosure, the gate reset module 2 and the threshold compensation module 3 are not directly connected to the control terminal of the driving module 1. Instead, a control module 4 is incorporated between the gate reset module 2, the threshold compensation module 3 and the control terminal of the driving module 1. In this way, the control terminal of the driving module 1 is directly connected to only one transistor path where the control module 4 is located. During the light-emitting control period T3, compared to the two leakage paths of the gate reset transistor and the threshold compensation transistor in the related art, the control terminal of the driving module 1 in the present disclosure has only one leakage path, that is, the path to the control node NO, thereby reducing the leakage paths.

Furthermore, when the control module 4 is provided, during the charging period T2, the control module 4 is turned on, making the voltage $V_{N1}$ at the control terminal of the driving module 1 equal to the voltage $V_{N0}$ at the control node N0. During the light-emitting control period T3, since the gate reset module 2, the threshold compensation module 3 and the control module 4 are all turned off, no external signal is written into the control terminal of the driving module 1 or the control node N0. Therefore, the voltage $V_{N1}$ at the control terminal of the driving module 1 and the voltage $V_{N0}$ at the control node remain consistent, causing the |Vds| corresponding to the control transistor M0 included in the control module 4 to approach 0.

As previously described, the smaller the |Vds| corresponding to a transistor is, the smaller leakage current of the transistor in the off-state will be. Therefore, during the light-emitting control period T3, the leakage current of the control transistor M0 will be very small, which may be regarded as approaching 0, and the control terminal of the driving module 1 will hardly leak current through this path. This effectively addresses the leakage problem of the driving module 1, making its operating state more stable and optimizing the circuit performance of the pixel circuit 100. When the pixel circuit 100 is applied in a display panel, it may effectively improve the flashing screen issues of the display panel and optimize the display effect.

In some embodiments of the present disclosure, referring again to FIG. 2 and FIG. 3, the control terminal of the control module 4 is electrically connected to a first scan line S1. Moreover, the time t of an enable level provided by the first scan line S1 covers the initialization period T1 and the charging period T2.

It is understandable that the level state of the enable level provided by the first scan line S1 is related to the type of the control transistor M0. When the control transistor M0 is a P-type transistor, the enable level provided by the first scan line S1 is a low level. When the control transistor M0 is an N-type transistor, the enable level provided by the first scan line S1 is a high level. FIG. 2 illustrates the case where the control transistor M0 is a P-type transistor.

The time t of the enable level provided by the first scan line S1 covers the initialization period T1 and the charging period T2. In other words, the first scan signal undergoes a transition from a non-enable level (high level) to an enable level (low level) at the latest when entering the initialization period T1, and a transition from the enable level to the non-enable level at the earliest at the end of the charging period T2.

In this manner, the pulse width of the enable level in the first scan signal is larger, which may reduce the frequency of level transitions in the first scan signal and the frequency of state switching of the control transistor M0, thereby reducing the potential fluctuations at nodes caused by signal transitions.

When the time t of the enable level provided by the first scan line S1 covers the initialization period T1 and the charging period T2, furthermore, the time point when the first scan signal undergoes the transition from the non-enable level to the enable level may be earlier than the initialization period T1, and the time point when the first scan signal undergoes the transition from the enable level to the non-enable level may be later than the charging period T2.

Referring again to FIG. 2, in one configuration, the control terminal of the gate reset module 2 is electrically connected to a third scan line S3, and during the initialization period T1, the gate reset module 2 is turned on in response to the enable level provided by the third scan line S3. The control electrode of the data writing module 5 is electrically connected to a second scan line S2, and during the charging period T2, the data writing module 5 is turned on in response to the enable level provided by the second scan line S2.

Refer to FIG. 3, the time point t1 when the first scan signal undergoes the transition from the non-enable level to the enable level is before the time point t2 when the third scan signal undergoes the transition from the non-enable level to the enable level. Therefore, the control module 4 is already turned on before the gate reset module 2 is turned on. After the gate reset module 2 is turned on, the voltage on the first signal line S may be written to the control terminal of the driving module 1 more quickly.

Additionally, the time point t3 when the first scan signal undergoes the transition from the enable level to the non-enable level is later than the time point t4 when the second scan signal undergoes the transition from the enable level to the non-enable level. This allows the control module 4 to be turned off after the data writing module 5 is turned off, avoiding insufficient charging due to untimely cut-off of the control module 4.

Figure 4:
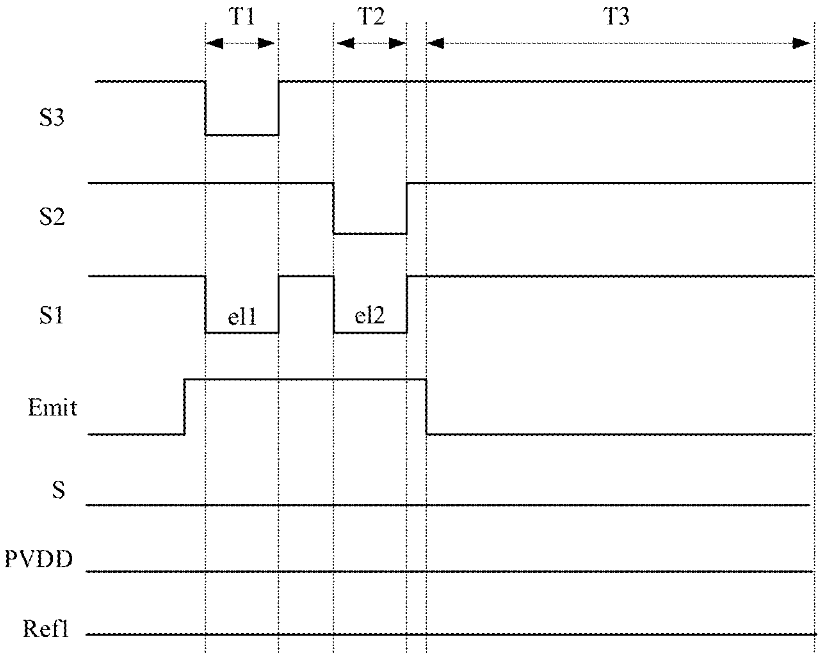
FIG. 4 is a timing diagram corresponding to FIG. 2 according to some embodiments of the present disclosure.

In some embodiments of the present disclosure, referring to FIG. 2 and FIG. 4, where FIG. 4 shows a timing diagram corresponding to FIG. 2, the control terminal of the control module 4 is electrically connected to the first scan line S1. Furthermore, the first scan line S1 provides a first enable level el1 during the initialization period T1 and a second enable level el2 during the charging period T2, with an interval between the first enable level el1 and the second enable level el2.

Under this driving manner, after the initialization period T1 ends, the control module 4 first switches to an off state and then switches to an on state when entering the charging period T2. This ensures that the signal path between the control node N0 and the control terminal of the driving module 1 is completely cut off after the initialization period T1, preventing the potential at the control terminal of the driving module 1 from being affected by other signals.

Figure 5:
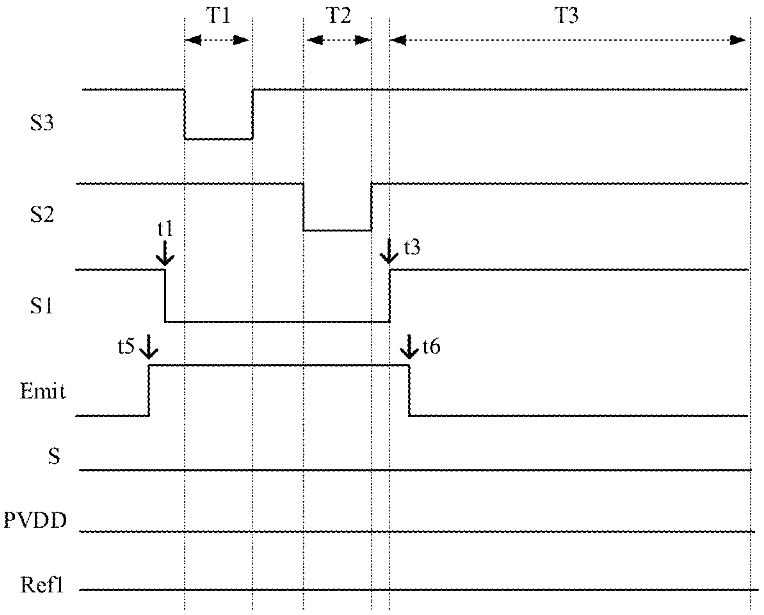
FIG. 5 is a timing diagram corresponding to FIG. 2 according to some embodiments of the present disclosure.

In some embodiments of the present disclosure, referring to FIG. 2 and FIG. 5, where FIG. 5 shows a timing diagram corresponding to FIG. 2, the control terminal of the control module 4 is electrically connected to the first scan line S1.

The pixel circuit 100 further includes a first light-emitting control module 6 and a second light-emitting control module 7. The control terminals of both the first light-emitting control module 6 and the second light-emitting control module 7 are electrically connected to a light-emitting control signal line Emit. The first light-emitting control module 6 is electrically connected between the first power supply line PVDD and the input terminal (second node N2) of the driving module 1, while the second light-emitting control module 7 is electrically connected between the output terminal (third node N3) of the driving module 1 and the light-emitting element 200.

The non-enable level provided by the light-emitting control signal line Emit covers the enable level provided by the first scan line S1, and the width of the non-enable level provided by the light-emitting control signal line Emit is greater than the width of the enable level provided by the first scan line S1.

The first light-emitting control module 6 includes a first light-emitting control transistor M5, and the second light-emitting control module 7 includes a second light-emitting control transistor M6. It is understandable that the level state of the non-enable level provided by the light-emitting control signal line Emit is related to the types of the first light-emitting control transistor M5 and the second light-emitting control transistor M6. FIG. 2 schematically shows that the control transistor M0, the first light-emitting control transistor M5 and the second light-emitting control transistor M6 are all P-type transistors, the non-enable level in the light-emitting control signal is a high level, and the enable level in the first scan signal is a low level.

In the above-mentioned method, the time point t5 when the light-emitting control signal undergoes a transition from the enable level to the non-enable level is earlier than the time point t1 when the first scan signal undergoes a transition from the non-enable level to the enable level, and the time point t6 when the light-emitting control signal undergoes a transition from the non-enable level to the enable level is later than the time point t3 when the first scan signal undergoes a transition from the enable level to the non-enable level. This ensures that the control module 4 is turned off during the light-emitting period, thereby cutting off the signal path between the control terminal of the driving module 1 and other transistors, preventing the control terminal of the driving module 1 from being affected by other signals.

Figure 6:
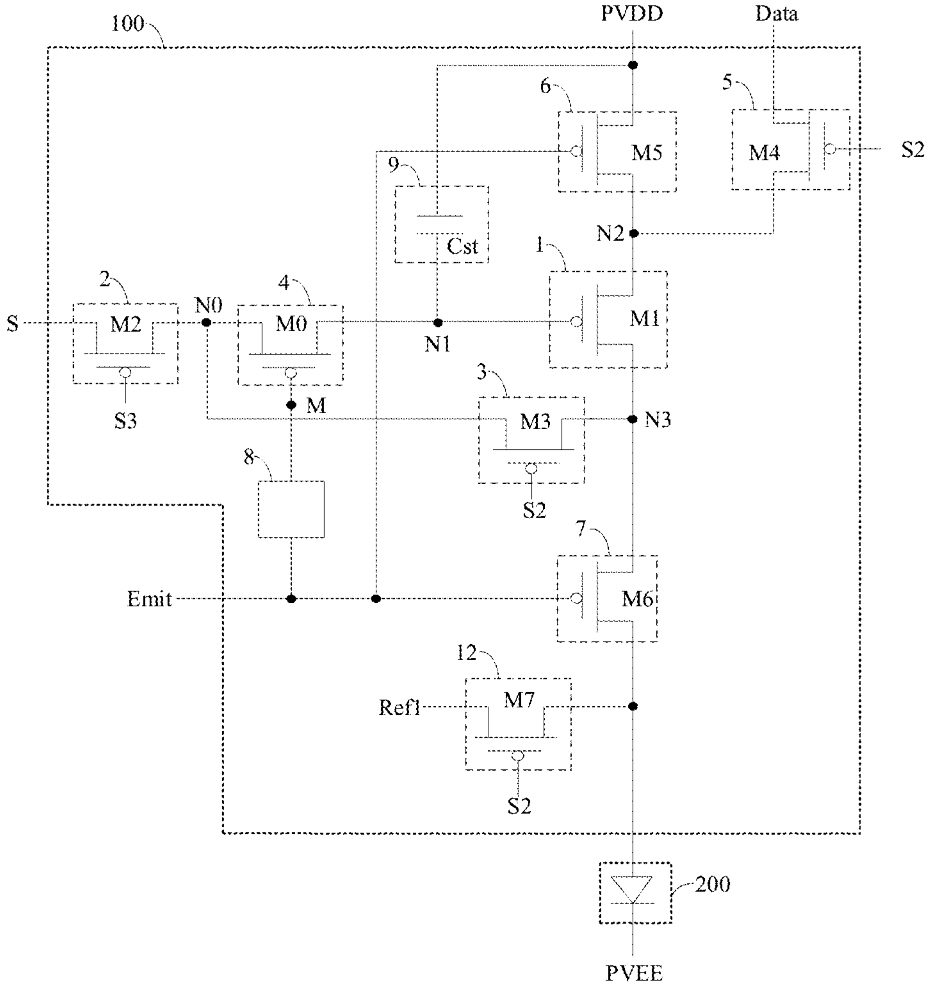
FIG. 6 is a structural schematic diagram of a pixel circuit according to some embodiments of the present disclosure.
Figure 7:
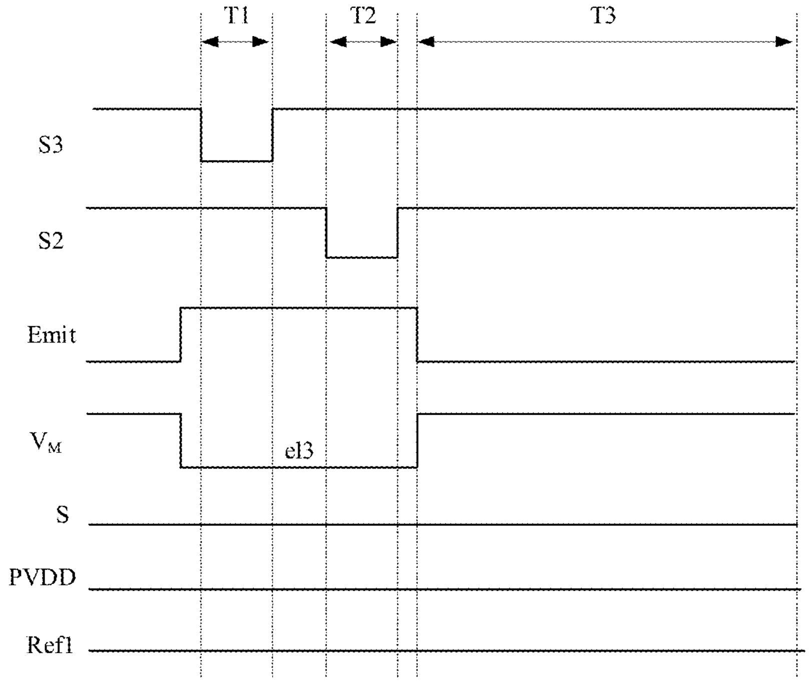
FIG. 7 is a timing diagram corresponding to FIG. 6 according to some embodiments of the present disclosure.

In some embodiments of the present disclosure, as shown in FIG. 6 and FIG. 7, where FIG. 6 is a structural diagram of the pixel circuit 100 according to some embodiments of the present disclosure, and FIG. 7 is a timing diagram corresponding to FIG. 6. The pixel circuit 100 further includes a first light-emitting control module 6 and a second light-emitting control module 7. The control terminals of both the first light-emitting control module 6 and the second light-emitting control module 7 are electrically connected to the light-emitting control signal line Emit. The first light-emitting control module 6 is electrically connected between the first power supply line PVDD and the input terminal (second node N2) of the driving module 1, while the second light-emitting control module 7 is electrically connected between the output terminal (third node N3) of the driving module 1 and the light-emitting element 200.

The control terminal of the control module 4 is electrically connected to the light-emitting control signal line Emit through an inverter 8. The control module 4 is turned on in response to a first enable level el3, which is opposite to the non-enable level provided by the light-emitting control signal line Emit. In other words, when the non-enable level of the light-emitting control signal is a high level, the first enable level el3 is a low level, and the control module 4 is turned on in response to the low level.

In FIG. 7, VM represents the signal of node M illustrated in FIG. 6, which is the signal after the light-emitting control signal is inverted by the inverter 8.

Since the light-emitting control signal remains at the non-enable level during both the initialization period T1 and the charging period T2, the light-emitting control signal is inverted by the inverter 8 and written to the control terminal of the control module 4 during these two periods, enabling the control module 4 to be in an on state. This allows the pixel circuit 100 to normally perform initialization and charging operations. With this configuration, there is no need to provide an additional scan line for the control terminal of the control module 4, and correspondingly, no additional signal ports need to be provided in the driving chip.

Figure 8:
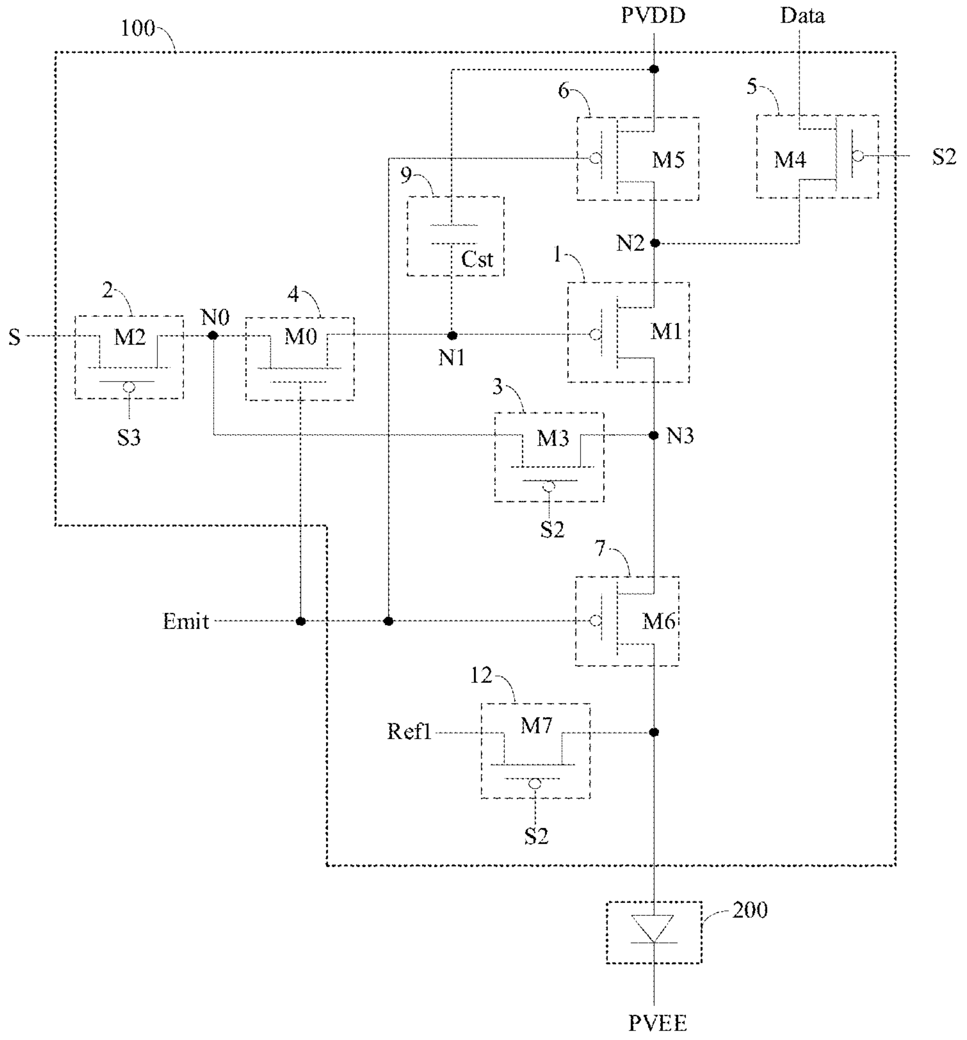
FIG. 8 is a structural schematic diagram of a pixel circuit according to some embodiments of the present disclosure.
Figure 9:
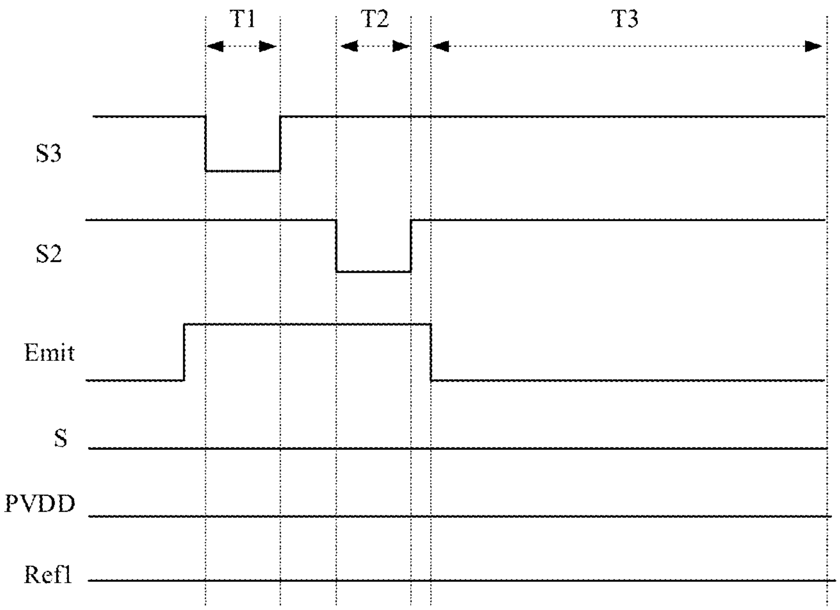
FIG. 9 is a timing diagram corresponding to FIG. 8 according to some embodiments of the present disclosure.

In some embodiments of the present disclosure, as shown in FIGS. 8 and 9, where FIG. 8 is a structural diagram of the pixel circuit 100 according to some embodiments of the present disclosure, and FIG. 9 is a timing diagram corresponding to FIG. 8. The pixel circuit 100 further includes a first light-emitting control module 6 and a second light-emitting control module 7. The control terminals of both the first light-emitting control module 6 and the second light-emitting control module 7 are electrically connected to the light-emitting control signal line Emit. The first light-emitting control module 6 is electrically connected between the first power supply line PVDD and the input terminal (second node N2) of the driving module 1, while the second light-emitting control module 7 is electrically connected between the output terminal (third node N3) of the driving module 1 and the light-emitting element 200.

The control terminal of the control module 4 is electrically connected to the light-emitting control signal line Emit, where the control module 4 is turned on in response to the non-enable level provided by the light-emitting control signal line Emit.

In other words, the type of the control transistor M0 is opposite to that of the first light-emitting control transistor M5 and the second light-emitting control transistor M6. In the structure illustrated in FIG. 8, the first light-emitting control transistor M5 and the second light-emitting control transistor M6 are P-type transistors, while the control transistor M0 is a N-type transistor. Therefore, when the light-emitting control signal line Emit provides a non-enable level (high level), the control transistor M0 may be turned on in response to the high level.

It can be understood that in other alternative embodiments, the first light-emitting control transistor M5 and the second light-emitting control transistor M6 may be N-type transistors, while the control transistor M0 is a P-type transistor. In this case, when the light-emitting control signal line Emit provides a non-enable level (low level), the control transistor M0 may be turned on in response to the low level.

With this configuration, the control terminal of the control module 4 is directly connected to the existing light-emitting control signal line Emit, so that it is not required to provide an additional scan line for the control terminal of the control module 4 and additional signal ports in the driving chip, resulting in a simpler structural design.

In some embodiments of the present disclosure, referring again to FIG. 2 and FIG. 3, the control terminals of both the control module 4 and the threshold compensation module 3 are electrically connected to the first scan line S1. During the initialization period T1 and the charging period T2, the control module 4 and the threshold compensation module 3 are turned on in response to the enable level provided by the first scan line S1.

The pixel circuit 100 further includes a data writing module 5, which is electrically connected between the data line Data and the input terminal of the driving module 1. The control electrode of the data writing module 5 is electrically connected to the second scan line S2. During the charging period T2, the data writing module 5 is turned on in response to the enable level provided by the second scan line S2.

Based on the above structure, during the initialization period T1, the gate reset module 2, the control module 4 and the threshold compensation module 3 are all turned on. The voltage on the first signal line S is written into the control terminal of the driving module 1 through the conductive gate reset module 2 and control module 4, resetting the control terminal of the driving module 1. Although the threshold compensation module 3 is also turned on during this period, since the data writing module 5 is turned off, the voltage on the data line Data will not be written into the control terminal of the driving module 1 through the threshold compensation module 3 and the control module 4, thus having no impact on the reset of the driving module 1.

During the charging period T2, the data writing module 5, the threshold compensation module 3 and the control module 4 are all turned on. The voltage on the data line Data is written into the control terminal of the driving module 1, charging the control terminal of the driving module 1 and performing threshold compensation.

Figure 10:
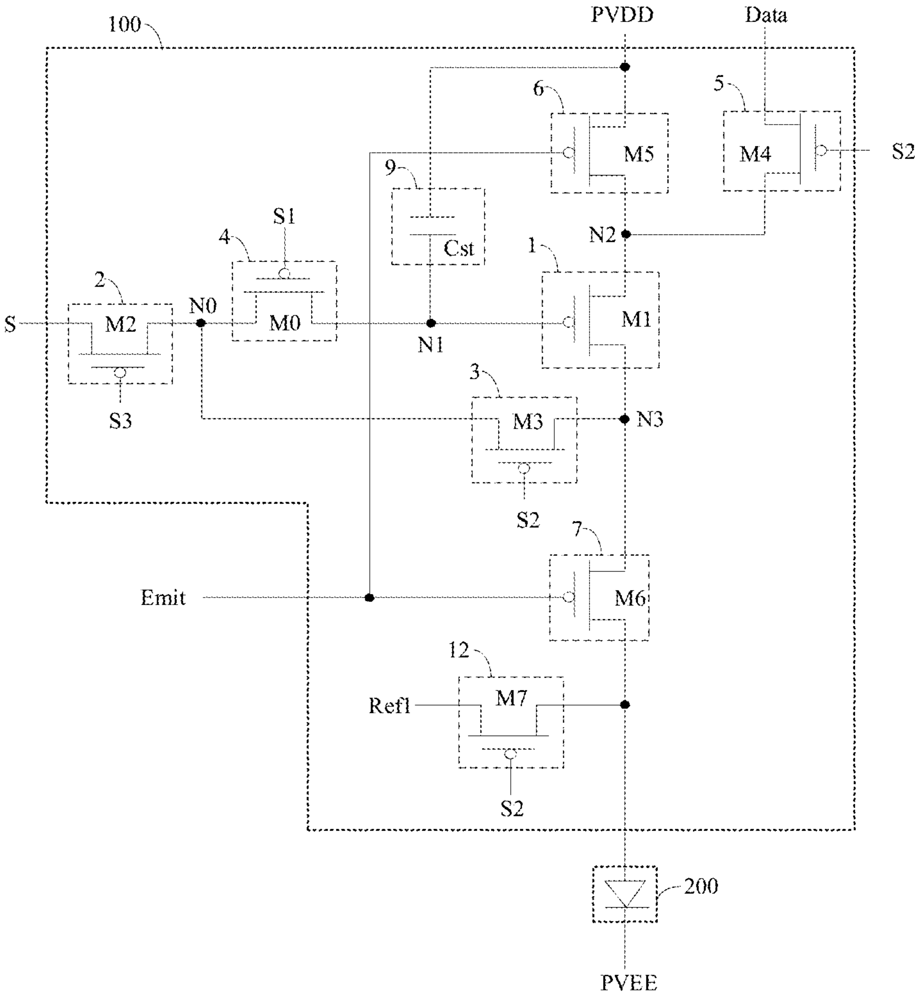
FIG. 10 is a structural schematic diagram of a pixel circuit according to some embodiments of the present disclosure.

In some embodiments of the present disclosure, combining FIG. 10 and FIG. 3, where FIG. 10 is a structural diagram of the pixel circuit 100 according to some embodiments of the present disclosure. The control terminal of the control module 4 is electrically connected to the first scan line S1. During the initialization period T1 and the charging period T2, the control module 4 is turned on in response to the enable level provided by the first scan line S1.

The control terminal of the threshold compensation module 3 is electrically connected to the second scan line S2. During the charging period T2, the threshold compensation module 3 is turned on in response to the enable level provided by the second scan line S2.

Additionally, the pixel circuit 100 includes a data writing module 5, which is electrically connected between the data line Data and the input terminal of the driving module 1. The control electrode of the data writing module 5 is further electrically connected to the second scan line S2. During the charging period T2, the data writing module 5 is turned on in response to the enable level provided by the second scan line S2.

Based on the above structure, during the initialization period T1, the gate reset module 2 and the control module 4 are turned on, performing a reset operation on the control terminal of the driving module 1. During the charging period T2, the data writing module 5, the threshold compensation module 3 and the control module 4 are turned on, performing a charging operation on the control terminal of the driving module 1. In this structure, the threshold compensation module 3 is turned off during the initialization period T1 and only is turned on during the charging period T2, thereby completely cutting off the signal path between the output terminal of the driving module 1 and the control node N0 during the initialization period T1, preventing signals on the path of the threshold compensation module 3 from affecting the reset operation.

In some embodiments of the present disclosure, referring again to FIG. 2, the pixel circuit 100 further includes a capacitor module 9. The capacitor module 9 is electrically connected between the first power supply line PVDD and the control terminal of the driving module 1, thereby utilizing the capacitor module 9 to stabilize the potential of the control terminal of the driving module 1. Therefore, fluctuations are avoided in the potential of the control terminal of the driving module 1 during the light-emitting control period T3, so that the potential of the control terminal of the driving module 1 is consistent with the potential of the control node N0, and the |Vds| corresponding to the control transistor approaches 0.

The capacitor module 9 includes a storage capacitor Cst, with the first plate of the storage capacitor Cst electrically connected to the first power supply line PVDD, and the second plate of the storage capacitor Cst electrically connected to the control terminal of the driving module 1.

Figure 11:
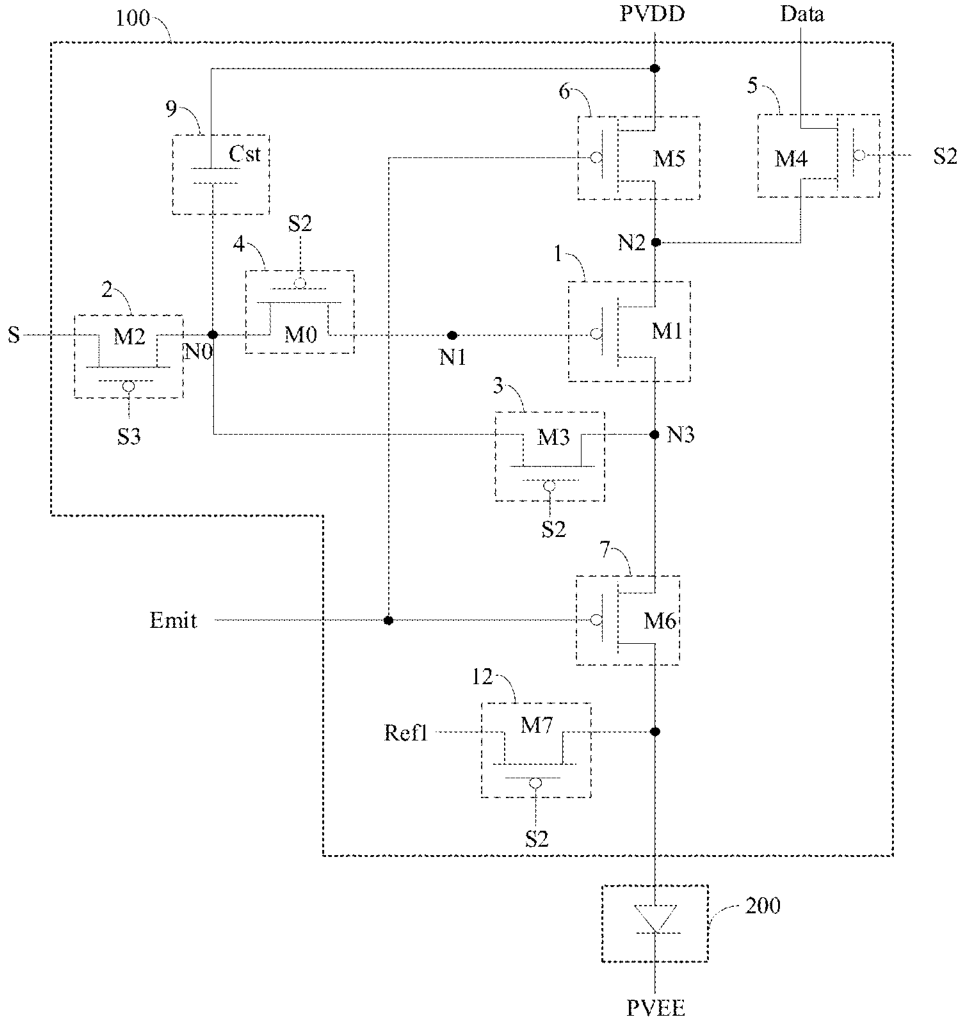
FIG. 11 is a structural schematic diagram of a pixel circuit according to some embodiments of the present disclosure.

In some embodiments of the present disclosure, as shown in FIG. 11, which is a structural diagram of the pixel circuit 100 according to some embodiments of the present disclosure, the pixel circuit 100 further includes a capacitor module 9. The capacitor module 9 is electrically connected between the first power supply line PVDD and the control node N0, utilizing the capacitor module 9 to stabilize the potential of the control node N0. Therefore, fluctuations are avoided in the potential of the control node N0 during the light-emitting control period T3, so that the potential of the control node N0 is consistent with the potential of the control terminal of the driving module 1, and in turn, the control transistor M0 has almost no leakage current.

The capacitor module 9 includes a storage capacitor Cst, with the first plate of the storage capacitor Cst electrically connected to the first power supply line PVDD, and the second plate of the storage capacitor Cst electrically connected to the control node N0.

Figure 12:
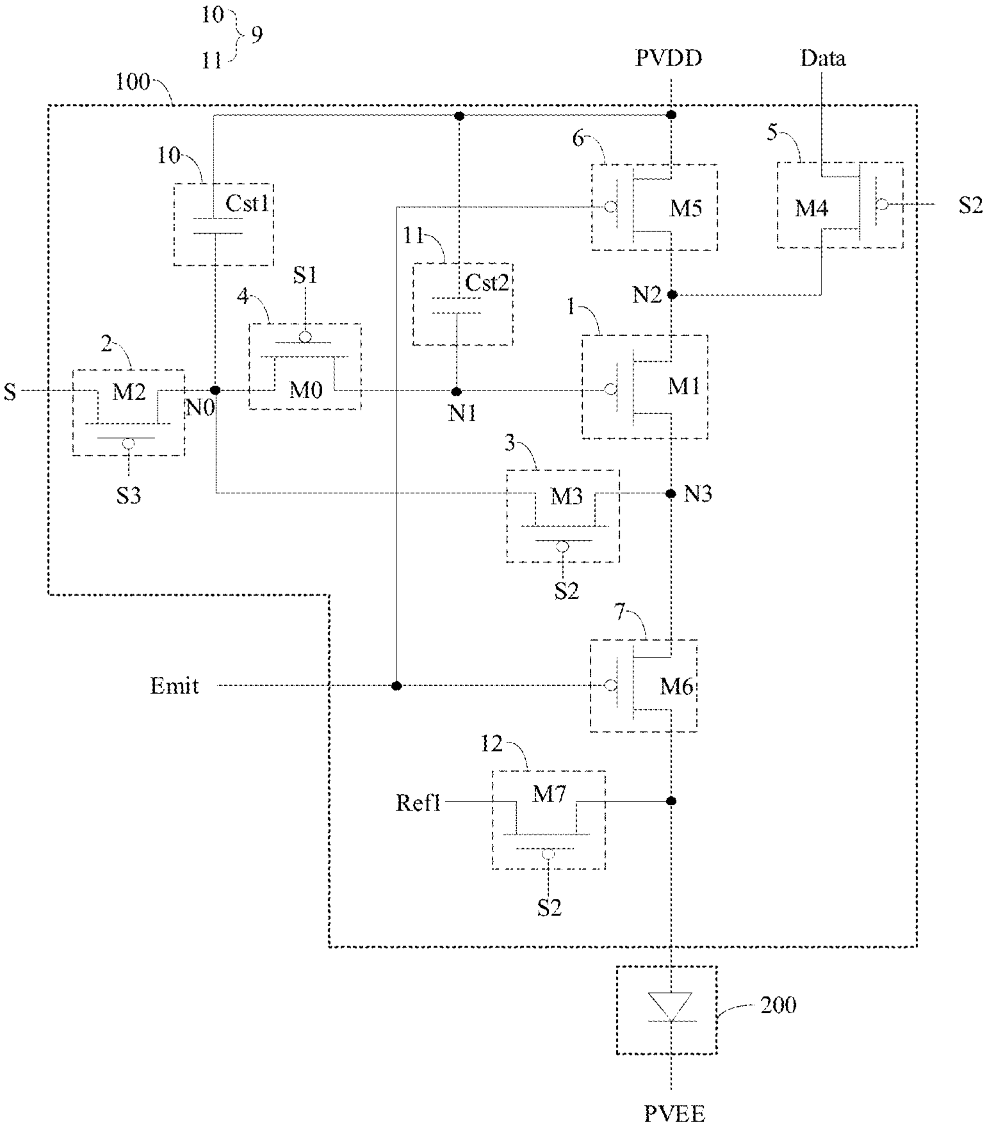
FIG. 12 is a structural schematic diagram of a pixel circuit according to some embodiments of the present disclosure.

In some embodiments of the present disclosure, as shown in FIG. 12, which is a structural diagram of the pixel circuit 100 according to some embodiments of the present disclosure, the pixel circuit 100 further includes a capacitor module 9, which includes a first capacitor sub-module 10 and a second capacitor sub-module 11. The first capacitor sub-module 10 is electrically connected between the first power supply line PVDD and the control node N0, while the second capacitor sub-module 11 is electrically connected between the first power supply line PVDD and the control terminal of the driving module 1.

This structure incorporates two capacitor sub-modules, the potentials of both the control node N0 and the control terminal of the driving module 1 can simultaneously be stabilized, so that the potential of the control node N0 is consistent with the potential of the control terminal of the driving module 1 during the light-emitting control period T3 to a greater extent.

The first capacitor sub-module 10 includes a first storage capacitor Cst1, the first plate of the first storage capacitor Cst1 is electrically connected to the first power supply line PVDD, and the second plate of the first storage capacitor Cst1 is electrically connected to the control node N0. The second capacitor sub-module 11 includes a second storage capacitor Cst2, the first plate of the second storage capacitor Cst2 is electrically connected to the first power supply line PVDD, and the second plate of the second storage capacitor Cst2 is electrically connected to the first node N1.

Figure 13:
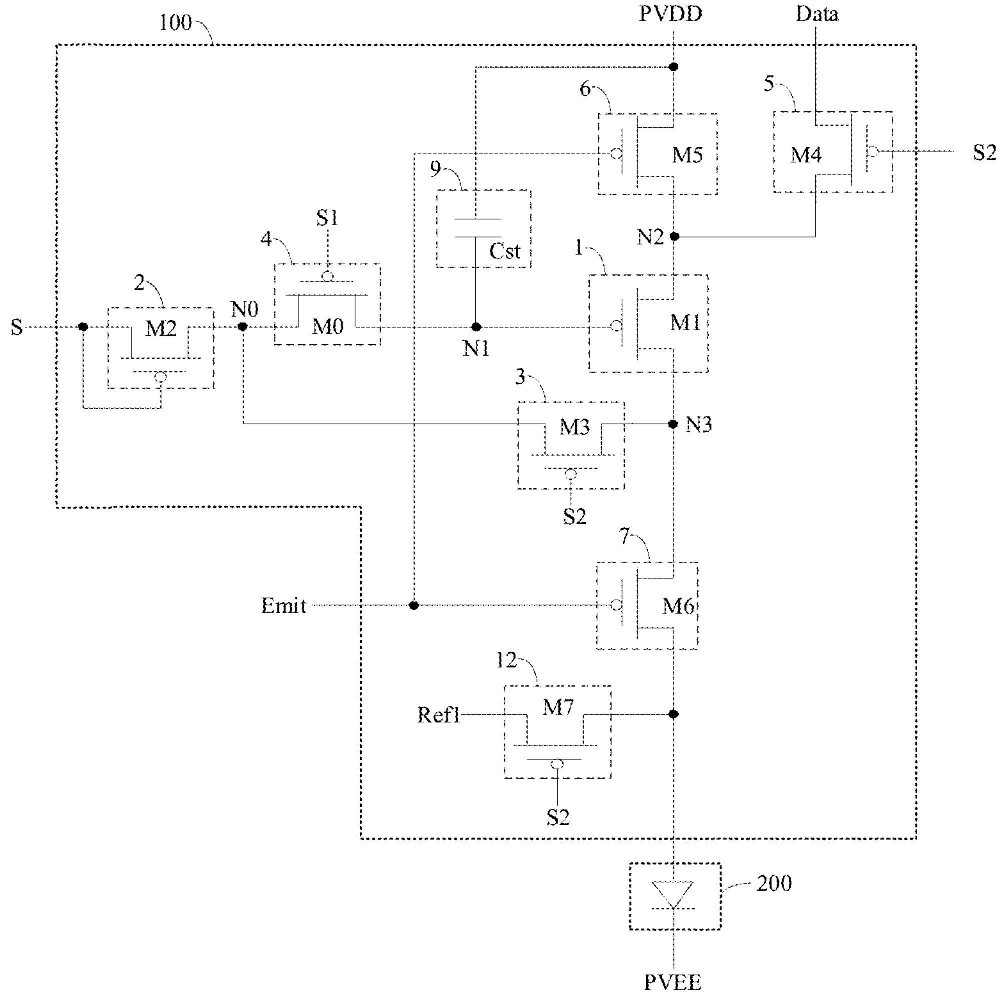
FIG. 13 is a structural schematic diagram of a pixel circuit according to some embodiments of the present disclosure.
Figure 14:
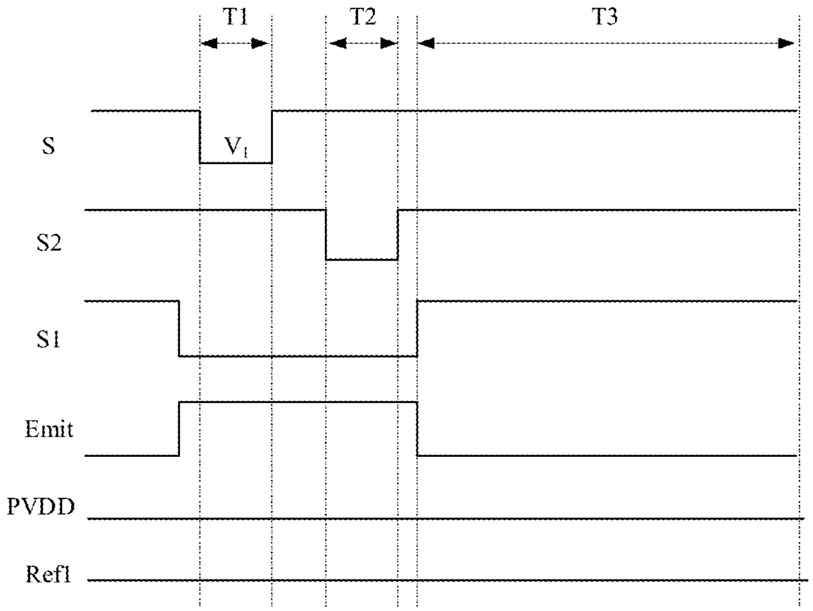
FIG. 14 is a timing diagram corresponding to FIG. 13 according to some embodiments of the present disclosure.

In some embodiments of the present disclosure, as shown in FIGS. 13 and 14, where FIG. 13 is a structural diagram of the pixel circuit 100 according to some embodiments of the present disclosure, and FIG. 14 is a timing diagram corresponding to FIG. 13. The control terminal of the gate reset module 2 is electrically connected to the first signal line S.

During the initialization period T1, the gate reset module 2 is turned on in response to the enable level provided by the first signal line S, the voltage of the enable level provided by the first signal line S is written into the control node N0. During the charging period T2 and the light-emitting control period T3, the gate reset module 2 is turned off in response to the non-enable level provided by the first signal line S.

Regarding the enable level provided by the first signal line S during the initialization period T1, the voltage of the enable level may not only control the gate reset module 2 to be turned on, but also control the control terminal of the driving module 1 to reset. During periods other than the initialization period T1, the first signal line S provides a non-enable level, and the gate reset module 2 is turned off.

In this structure, the first signal line S provides a clock signal and may further be regarded as a first scan line.

The gate reset module 2 includes a gate reset transistor M2. The electrical connection between the control terminal of the gate reset module 2 and the first signal line S enables the gate reset transistor M2 to form a unilateral conductive structure with gate-source connection, allowing the gate reset transistor M2 to effectively avoid electrical leakage and further stabilize the potential of the control terminal of the driving module 1.

Furthermore, referring again to FIG. 12, the pixel circuit 100 further includes an anode reset module 12, which is electrically connected between an anode reset line Ref1 and the light-emitting element 200. During the initialization period T1 or the charging period T2, the anode reset module 12 is turned on.

The voltage of the enable level provided by the first signal line S is V1, and the voltage provided by the anode reset line Ref1 is V2, where $V1+|Vth|<V2$, and Vth is a threshold voltage of the gate reset transistor M2.

After the gate reset transistor M2 is turned on, the potential of the control node N0 is $V1+|Vth|$. To better satisfy the reset requirement of the control terminal of the driving module 1, $V1+|Vth|$ may be set to be less than V2. At this time, $V1+|Vth|$ will be more negative, resulting in a more thorough reset of the control terminal of the driving module 1.

Alternatively, referring to FIGS. 2 and 3 again, when the control terminal of the control module 4 is electrically connected to the first scan line S1, the first signal line S may further serve as a gate reset line for providing a constant gate reset voltage.

In some embodiments of the present disclosure, referring to FIG. 2 again, the gate reset module 2 includes a gate reset transistor M2, the first electrode of the gate reset transistor M2 is electrically connected to the first signal line S, the second electrode of the gate reset transistor M2 is electrically connected to the control node N0, and the gate reset transistor M2 includes a channel.

The threshold compensation module 3 includes a threshold compensation transistor M3, the first electrode of the threshold compensation transistor M3 is electrically connected to the output terminal of the driving module 1, the second electrode of the threshold compensation transistor M3 is electrically connected to the control node N0, and the threshold compensation transistor M3 includes a channel.

It is understandable that in the layer structure of a transistor, the active layer of the transistor includes a first doped region, a channel, and a second doped region. The channel is a part overlapping with the gate. When a transistor only includes one channel, it means that the transistor is a single-tube structure, which is the smallest transistor unit.

Since the embodiments of the present disclosure may effectively solve the leakage problem of the driving module 1, compared to FIG. 1, there is no need to set the transistors in the gate reset module 2 and the threshold compensation module 3 as double-gate structures. Instead, only single-tube structures are required for the transistors in these two modules, thereby reducing the number of transistors required in the pixel circuit 100.

The overall structure of the pixel circuit 100 is described below.

The pixel circuit 100 includes a driving module 1, a control module 4, a gate reset module 2, a threshold compensation module 3, a data writing module 5, a first light-emitting control module 6, a second light-emitting control module 7, an anode reset module 12 and a capacitor module 9.

The driving module 1 includes a driving transistor M1. A gate of the driving transistor M1 is electrically connected to the first node N1, a first electrode of the driving transistor M1 is electrically connected to the second node N2, and a second electrode of the driving transistor M1 is electrically connected to the third node N3.

The gate reset module 2 includes a gate reset transistor M2. A first electrode of the gate reset transistor M2 is electrically connected to the first signal line S, and a second electrode of the gate reset transistor M2 is electrically connected to the control node N0.

The threshold compensation module 3 includes a threshold compensation transistor M3. A first electrode of the threshold compensation transistor M3 is electrically connected to the third node N3, and a second electrode of the threshold compensation transistor M3 is electrically connected to the first node N1.

The control module 4 includes a control transistor M0. A first electrode of the control transistor M0 is electrically connected to the control node N0, and a second electrode of the control transistor M0 is electrically connected to the first node N1.

The data writing module 5 includes a data writing transistor M4. A gate of the data writing transistor M4 is electrically connected to the second scan line S2, a first electrode of the data writing module 5 is electrically connected to the data line Data, and a second electrode of the data writing transistor M4 is electrically connected to the second node N2.

The first light-emitting control module 6 includes a first light-emitting control transistor M5. A gate of the first light-emitting control transistor M5 is electrically connected to the light-emitting control signal line Emit, a first electrode of the first light-emitting control transistor M5 is electrically connected to the first power supply line PVDD, and a second electrode of the first light-emitting control transistor M5 is electrically connected to the second node N2.

The second light-emitting control module 7 includes a second light-emitting control transistor M6. A gate of the second light-emitting control transistor M6 is electrically connected to the light-emitting control signal line Emit, a first electrode of the second light-emitting control transistor M6 is electrically connected to the third node N3, and a second electrode of the second light-emitting control transistor M6 is electrically connected to the light-emitting element 200.

The anode reset module 12 includes an anode reset transistor M7. Agate of the anode reset transistor M7 is electrically connected to the second scan line S2, a first electrode of the anode reset transistor M7 is electrically connected to the anode reset line Ref1, and a second electrode of the anode reset transistor M7 is electrically connected to the light-emitting element 200.

The gate of the gate reset transistor M2 may be electrically connected to the third scan line S3 as shown in FIG. 2, or it may be electrically connected to the first signal line S as shown in FIG. 13.

The gate of the control transistor M0 may be electrically connected to the first scan line S1 as shown in FIG. 2, or it may be electrically connected to the light-emitting control signal line Emit through an inverter 8 as shown in FIG. 6. Alternatively, as shown in FIG. 8, the control transistor M0 is an N-type transistor, and the gate of the control transistor M0 is electrically connected to the light-emitting control signal line Emit.

The gate of the threshold compensation transistor M3 may be electrically connected to the first scan line S1 as shown in FIG. 2, or it may be electrically connected to the second scan line S2 as shown in FIG. 6.

The structures of the capacitor module 9 have already been described in the above embodiments, so they will not be elaborated here.

Based on a same inventive concept, embodiments of the present disclosure further provide a method for driving a pixel circuit 100. Combining FIGS. 2 and 3, the pixel circuit 100 includes a driving module 1, a gate reset module 2, a threshold compensation module 3, and a control module 4. The gate reset module 2 is electrically connected between the first signal line S and the control node N0. The threshold compensation module 3 is electrically connected between the output end of the driving module 1 and the control node N0. The control module 4 is electrically connected between the control node N0 and the control terminal of the driving module 1.

A driving cycle of the pixel circuit 100 includes an initialization period T1, a charging period T2, and a light-emitting control period T3. The method includes: controlling the gate reset module 2 to be turned on during the initialization period T1, controlling the threshold compensation module 3 to be turned on at least during the charging period T2, and controlling the control module 4 to be turned on during the initialization period T1 and the charging period T2 and to be turned off during the light-emitting control period T3.

Combining the aforementioned analysis, adopting the method according to some embodiments of the present disclosure may effectively solve the leakage problem of the driving module 1 in the pixel circuit 100, improve the operation performance of the pixel circuit 100, and further enhance the emission accuracy of the light-emitting element 200.

Furthermore, referring to FIGS. 13 and 14 again, the control terminal of the gate reset module 2 is electrically connected to the first signal line S.

During the initialization period T1, the first signal line S is controlled to provide an enable level, enabling the gate reset module 2 to be turned on in response to the enable level provided by the first signal line S, and transmitting the voltage of the enable level provided by the first signal line S to the control node N0. During the charging period T2 and the light-emitting control period T3, the first signal line S is controlled to provide a non-enable level, causing the gate reset module 2 to be turned off in response to the non-enable level provided by the first signal line S.

Regarding the enable level provided by the first signal line S during the initialization period T1, the voltage of the enable level may both control the gate reset module 2 to be turned on and reset the control terminal of the driving module 1. During periods other than the initialization period T1, the first signal line S provides a non-enable level, and the gate reset module 2 is turned off.

The gate reset module 2 includes a gate reset transistor M2. The electrical connection between the control terminal of the gate reset module 2 and the first signal line S enables the gate reset transistor M2 to form a unilateral conductive structure with gate-source connection, allowing the gate reset transistor M2 to effectively avoid electrical leakage and further stabilize the potential at the control terminal of the driving module 1.

Figure 15:
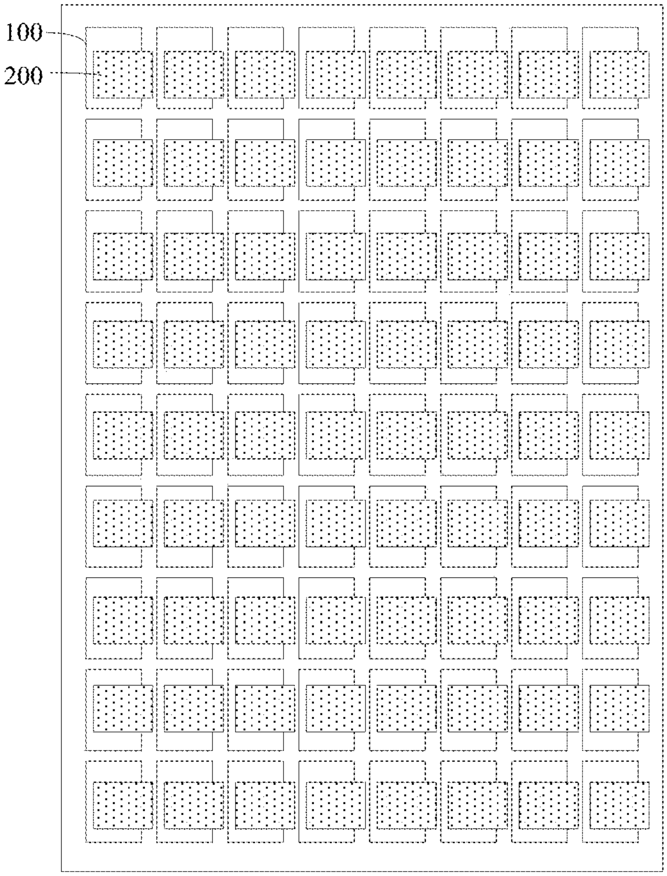
FIG. 15 is a structural schematic diagram of a display panel according to some embodiments of the present disclosure.

Based on the same inventive concept, embodiments of the present disclosure further provide a display panel, as shown in FIG. 15. FIG. 15 is a structural schematic diagram of a display panel according to some embodiments of the present disclosure. The display panel includes pixel circuits 100 and light-emitting elements 200 that are electrically connected. The specific structure of the pixel circuit 100 has been detailed in the above embodiments and will not be elaborated here. The light-emitting element 200 may be an organic light-emitting diode (OLED).

Figure 16:
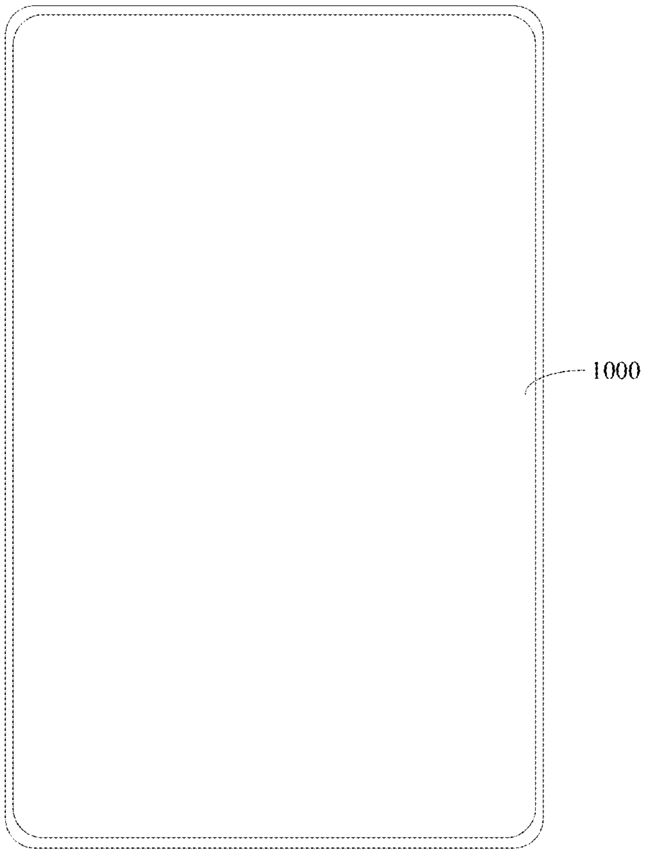
FIG. 16 is a structural schematic diagram of a display apparatus according to some embodiments of the present disclosure.

Based on a same inventive concept, embodiments of the present disclosure further provides a display apparatus, as shown in FIG. 16. FIG. 16 is a structural schematic diagram of a display apparatus according to some embodiments of the present disclosure. The display apparatus 1000 includes the aforementioned display panel. It can be understood that the display apparatus shown in FIG. 16 is merely illustrative, and the display apparatus may be any electronic device with display functions, such as a mobile phone, a tablet computer, a laptop computer, an e-book reader, or a television.

The above are merely exemplary embodiments of the present disclosure, which, as mentioned above, are not used to limit the present disclosure. Whatever within the principles of the present disclosure, including any modification, equivalent substitution, improvement, etc., shall fall into the protection scope of the present disclosure.

Finally, it should be noted that the technical solutions of the present disclosure are illustrated by the above embodiments, but not intended to limit thereto. Although the present disclosure has been described in detail with reference to the foregoing embodiments, those skilled in the art can understand that the present disclosure is not limited to the specific embodiments described herein, and can make various modifications, readjustments, and substitutions without departing from the scope of the present disclosure.

What is claimed is:

1. A display panel, comprising a pixel circuit, wherein the pixel circuit comprises:

a driving module;

a gate reset module electrically connected between a first signal line and a control node;

a threshold compensation module electrically connected between an output terminal of the driving module and the control node;

a first scan line;

a data writing module; and a control module electrically connected between the control node and a control terminal of the driving module;

wherein a driving cycle of the pixel circuit comprises an initialization period, a charging period, and a light-emitting control period, the gate reset module is turned on during the initialization period, the threshold compensation module is turned on at least during the charging period, and the control module is turned on during the initialization period and the charging period and is turned off during the light-emitting control period, wherein a control terminal of the control module is electrically connected to the first scan line, wherein the first scan line provides a first enable level during the initialization period and a second enable level during the charging period, and there is an interval between the first enable level and the second enable level, wherein a control terminal of the control module and a control terminal of the threshold compensation module are both electrically connected to the first scan line, and during the initialization period and the charging period, the control module and the threshold compensation module are turned on in response to an enable level provided by the first scan line; and the data writing module is electrically connected between a data line and an input terminal of the driving module, a control electrode of the data writing module is electrically connected to a second scan line, and during the charging period, the data writing module is turned on in response to an enable level provided by the second scan line.

2. The display panel according to claim 1, wherein a period during which an enable level is provided by the first scan line covers the initialization period and the charging period.

3. The display panel according to claim 1, further comprising a first light-emitting control module and a second light-emitting control module, wherein a control terminal of the control module is electrically connected to the first scan line; and a control terminal of the first light-emitting control module and a control terminal of the second light-emitting control module are both electrically connected to a light-emitting control signal line, the first light-emitting control module is electrically connected between a first power line and an input terminal of the driving module, and the second light-emitting control module is electrically connected between the output terminal of the driving module and a light-emitting element;

wherein a non-enable level provided by the light-emitting control signal line covers an enable level provided by the first scan line, and a width of the non-enable level provided by the light-emitting control signal line is greater than a width of the enable level provided by the first scan line.

4. The display panel according to claim 1, further comprising a first light-emitting control module and a second light-emitting control module, wherein a control terminal of the first light-emitting control module and a control terminal of the second light-emitting control module are both electrically connected to a light-emitting control signal line, the first light-emitting control module is electrically connected between a first power line and an input terminal of the driving module, and the second light-emitting control module is electrically connected between the output terminal of the driving module and a light-emitting element; and wherein a control terminal of the control module is electrically connected to the light-emitting control signal line through an inverter, the control module is turned on in response to a first enable level, and the first enable level is opposite to a non-enable level provided by the light-emitting control signal line.

5. The display panel according to claim 1, further comprising a first light-emitting control module and a second light-emitting control module, wherein a control terminal of the first light-emitting control module and a control terminal of the second light-emitting control module are both electrically connected to a light-emitting control signal line, the first light-emitting control module is electrically connected between a first power line and an input terminal of the driving module, and the second light-emitting control module is electrically connected between the output terminal of the driving module and a light-emitting element; and wherein a control terminal of the control module is electrically connected to the light-emitting control signal line, and the control module is turned on in response to a non-enable level provided by the light-emitting control signal line.

6. The display panel according to claim 1, wherein a control terminal of the control module is electrically connected to the first scan line, and during the initialization period and the charging period, the control module is turned on in response to an enable level provided by the first scan line; and a control terminal of the threshold compensation module is electrically connected to a second scan line, and during the charging period, the threshold compensation module is turned on in response to an enable level provided by the second scan line.

7. The display panel according to claim 1, further comprising a capacitor module, wherein the capacitor module is electrically connected between a first power line and the control node.

8. The display panel according to claim 1, further comprising a capacitor module, wherein the capacitor module comprises a first capacitor sub-module and a second capacitor sub-module, the first capacitor sub-module is electrically connected between a first power line and the control node, and the second capacitor sub-module is electrically connected between the first power line and the control terminal of the driving module.

9. The display panel according to claim 1, wherein a control terminal of the gate reset module is electrically connected to the first signal line;

during the initialization period, the gate reset module is turned on in response to an enable level provided by the first signal line, and a voltage of the enable level provided by the first signal line is written into the control node; and during the charging period and the light-emitting control period, the gate reset module is turned off in response to a non-enable level provided by the first signal line.

10. The display panel according to claim 9, further comprising an anode reset module, wherein the anode reset module is electrically connected between an anode reset line and a light-emitting element, and the anode reset module is turned on during the initialization period or the charging period;

wherein the gate reset module comprises a gate reset transistor, a voltage of the enable level provided by the first signal line is V1, a voltage provided by the anode reset line is V2, $V1+|Vth|<V2$, and Vth is a threshold voltage of the gate reset transistor.

11. The display panel according to claim 1, wherein the gate reset module comprises a gate reset transistor, a first electrode of the gate reset transistor is electrically connected to the first signal line, a second electrode of the gate reset transistor is electrically connected to the control node, and the gate reset transistor comprises a channel; and the threshold compensation module comprises a threshold compensation transistor, a first electrode of the threshold compensation transistor is electrically connected to the output terminal of the driving module, a second electrode of the threshold compensation transistor is electrically connected to the control node, and the threshold compensation transistor comprises a channel.

12. A method for driving a display panel, wherein the display panel comprises a pixel circuit, the pixel circuit comprises a driving module, a gate reset module, a threshold compensation module, a first scan line, a data writing module, and a control module; wherein the gate reset module is electrically connected between a first signal line and a control node, the threshold compensation module is electrically connected between an output terminal of the driving module and the control node, and the control module is electrically connected between the control node and a control terminal of the driving module; and a driving cycle of the pixel circuit comprises an initialization period, a charging period, and a light-emitting control period;

wherein a control terminal of the control module is electrically connected to the first scan line, wherein the first scan line provides a first enable level during the initialization period and a second enable level during the charging period, and there is an interval between the first enable level and the second enable level, wherein a control terminal of the control module and a control terminal of the threshold compensation module are both electrically connected to the first scan line, and during the initialization period and the charging period, the control module and the threshold compensation module are turned on in response to an enable level provided by the first scan line; and the data writing module is electrically connected between a data line and an input terminal of the driving module, a control electrode of the data writing module is electrically connected to a second scan line, and during the charging period, the data writing module is turned on in response to an enable level provided by the second scan line, wherein the method comprises:

controlling the gate reset module to be turned on during the initialization period;

controlling the threshold compensation module to be turned on at least during the charging period; and controlling the control module to be turned on during the initialization period and the charging period and to be turned off during the light-emitting control period.

13. The method according to claim 12, wherein a control terminal of the gate reset module is electrically connected to the first signal line;

wherein the method further comprises:

controlling the first signal line to provide an enable level during the initialization period, so that the gate reset module is turned on in response to the enable level provided by the first signal line to transmit a voltage of the enable level provided by the first signal line to the control node; and controlling the first signal line to provide a non-enable level during the charging period and the light-emitting control period, so that the gate reset module is turned off in response to the non-enable level provided by the first signal line.

14. A display apparatus, comprising a display panel, wherein the display panel comprises a pixel circuit, and the pixel circuit comprises:

a driving module;

a gate reset module electrically connected between a first signal line and a control node;

a threshold compensation module electrically connected between an output terminal of the driving module and the control node;

a first scan line;

a data writing module; and a control module electrically connected between the control node and a control terminal of the driving module;

wherein a driving cycle of the pixel circuit comprises an initialization period, a charging period, and a light-emitting control period, the gate reset module is turned on during the initialization period, the threshold compensation module is turned on at least during the charging period, and the control module is turned on during the initialization period and the charging period and is turned off during the light-emitting control period, wherein a control terminal of the control module is electrically connected to the first scan line, wherein the first scan line provides a first enable level during the initialization period and a second enable level during the charging period, and there is an interval between the first enable level and the second enable level, wherein a control terminal of the control module and a control terminal of the threshold compensation module are both electrically connected to the first scan line, and during the initialization period and the charging period, the control module and the threshold compensation module are turned on in response to an enable level provided by the first scan line; and the data writing module is electrically connected between a data line and an input terminal of the driving module, a control electrode of the data writing module is electrically connected to a second scan line, and during the charging period, the data writing module is turned on in response to an enable level provided by the second scan line.

* * * * *